United States Patent
Nakanishi et al.

(10) Patent No.: US 11,907,489 B2
(45) Date of Patent: Feb. 20, 2024

(54) SENSOR MODULE AND DISPLAY DEVICE INCLUDING THE SENSOR MODULE

(71) Applicant: Japan Display Inc., Tokyo (JP)

(72) Inventors: Takayuki Nakanishi, Tokyo (JP); Makoto Hayashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/896,263

(22) Filed: Aug. 26, 2022

(65) Prior Publication Data

US 2023/0073861 A1    Mar. 9, 2023

(30) Foreign Application Priority Data

Sep. 3, 2021   (JP) ................... 2021-144078

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0448* (2019.05); *G06F 3/04164* (2019.05)

(58) Field of Classification Search
CPC .. G06F 3/0446; G06F 3/04164; G06F 3/0448; G06F 3/0412

USPC ......................................................... 345/174
See application file for complete search history.

(56) References Cited

U.S. PATENT DOCUMENTS

| | | | |
|---|---|---|---|
| 2013/0181943 A1* | 7/2013 | Bulea | G06F 3/041 345/174 |
| 2013/0342498 A1 | 12/2013 | Kim et al. | |
| 2014/0049486 A1 | 2/2014 | Kim et al. | |
| 2014/0049508 A1 | 2/2014 | Kim et al. | |
| 2018/0157354 A1* | 6/2018 | Blondin | G06F 3/04164 |
| 2021/0026479 A1* | 1/2021 | Lee | H10K 50/844 |
| 2022/0206656 A1* | 6/2022 | Park | G06F 3/0443 |
| 2022/0382398 A1* | 12/2022 | Park | G06F 3/046 |

* cited by examiner

*Primary Examiner* — Mark Edwards
(74) *Attorney, Agent, or Firm* — K&L Gates LLP (57) ABSTRACT

A sensor module includes: a plurality of sensor electrodes arranged in a plurality of rows and a plurality of columns; a plurality of terminals respectively corresponding to the plurality of sensor electrodes; and a plurality of sensor wirings respectively corresponding to the plurality of sensor electrodes. Each of the plurality of sensor wirings electrically connects the respective sensor electrode to the respective terminal without passing through any other sensor electrode. Each of the plurality of sensor electrodes does not overlap at least the plurality of sensor wirings other than the corresponding sensor wiring.

11 Claims, 12 Drawing Sheets

SENSOR MODULE AND DISPLAY DEVICE INCLUDING THE SENSOR MODULE

CROSS-REFERENCE TO RELATED APPLICATIONS

This application claims the benefit of priority to Japanese Patent Application No. 2021-144078, filed on Sep. 3, 2021, the entire contents of which are incorporated herein by reference.

FIELD

An embodiment of the present invention relates to a sensor module and a display device including the sensor module. For example, an embodiment of the present invention relates to a non-contact type sensor module and a display device including the non-contact type sensor module.

BACKGROUND

As an interface for inputting information to an information terminal, a touch sensor has been widely used. Currently, the mainstream touch sensors specify a position at which human fingers or hands directly contact the touch sensors. In recent years, a non-contact type sensor (hover sensor) has been developed in which information can be input by placing an input jig such as human fingers or hands or a touch pen (hereinafter, they are also referred to as an input means) close to the touch sensor without causing the input jig to contact the touch sensor.

SUMMARY

An embodiment of the present invention is a sensor module. The sensor module includes: a plurality of sensor electrodes arranged in a plurality of rows and a plurality of columns; a plurality of terminals respectively corresponding to the plurality of sensor electrodes; and a plurality of sensor wirings respectively corresponding to the plurality of sensor electrodes. Each of the plurality of sensor wirings electrically connects the respective sensor electrode to the respective terminal without passing through any other sensor electrode. Each of the plurality of sensor electrodes does not overlap at least the plurality of sensor wirings other than the corresponding sensor wiring (see, US Patent Application Publications No. 2014/0049486, 2013/0342498, and 2014/0049508).

An embodiment of the present invention is a display device. The display device includes: a display module including an array substrate including a plurality of pixels; and a sensor module over the display module. The sensor module includes: a plurality of sensor electrodes arranged in a plurality of rows and a plurality of columns; a plurality of terminals respectively corresponding to the plurality of sensor electrodes; and a plurality of sensor wirings respectively corresponding to the plurality of sensor electrodes. Each of the plurality of sensor wirings electrically connects the respective sensor electrode to the respective terminal without passing through any other sensor electrode. Each of the plurality of sensor electrodes does not overlap at least the plurality of sensor wirings other than the corresponding sensor wiring.

DESCRIPTION OF EMBODIMENTS

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, they are only an example, and do not limit the interpretation of the invention. In the specification and the drawings, the same reference number is provided to an element that is the same as that which appears in preceding drawings, and a detailed explanation may be omitted as appropriate. When a plurality of the same or similar structures is collectively represented, a reference number is used, while a hyphen and a natural number follow the reference number when the structures are independently represented. In addition, when a part of a structure is represented, a small letter of the alphabet may be provided after the reference number.

In the specification and the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

In the specification and the claims, an expression "a structure is exposed from another structure" means a mode in which a part of the structure is not covered by the other structure and includes a mode where the part uncovered by the other structure is further covered by another structure.

In the embodiments of the present invention, when a plurality of films is formed with the same process at the same time, these films have the same layer structure, the same material, and the same composition. Hence, the plurality of films is defined as existing in the same layer.

Hereinafter, the structures of a sensor module 200 and a display device 100 including the sensor module 200 according to an embodiment of the present invention are explained.

1. Outline Structure

Figure 1:
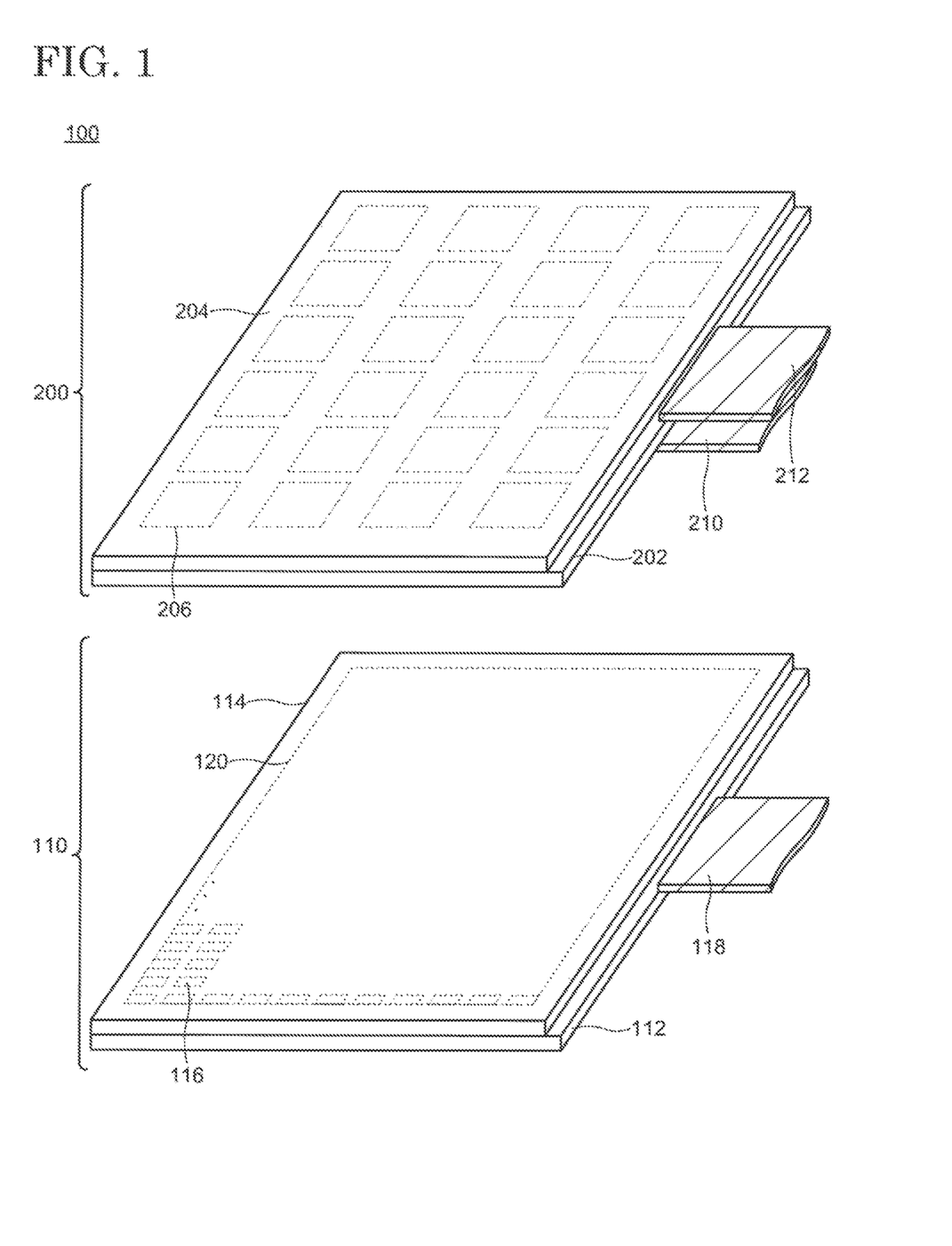
FIG. 1 is a schematic developed view of a display device according to an embodiment of the present invention.

A schematic developed view of the display device 100 is shown in FIG. 1. The display device 100 includes a display module 110 and the sensor module 200 arranged over the display module 110. The display module 110 and the sensor module 200 are fixed to each other with an adhesive which is not illustrated in FIG. 1.

2. Display Module

The display module 110 is a device having a function to display an image and includes an array substrate 112, a plurality of pixels 116, and a counter substrate 114 over the array substrate 112 as fundamental components. A minimum rectangular region surrounding the plurality of pixels 116 is called a display region 120. Each pixel 116 has a display element and functions as a minimum unit providing color information. As the display element, an electroluminescence light-emitting element exemplified by an organic electroluminescence light-emitting element (OLED) or the like may be used in addition to a liquid crystal element. When a liquid crystal element is employed, a light source (backlight) which is not illustrated is further provided to the display module 110. Each pixel 116 is operated according to a power source and image signals supplied through a connector 118 such as a flexible printed circuit (FPC) substrate and produces light with a specific color at a gradation on the basis of the image signals. The operation of the pixels 116 is controlled on the basis of the image signals, by which an image can be displayed on the display region 120.

There is no limitation to the size of the display module 110. For example, the size thereof may be a size called a 12.1 inch (31 cm) size which is used for a portable communication terminal, or a size (e.g., a 14.1 inch (36 cm) to 32 inch (81 cm) size) suitable for a monitor connected to a computer, a television, or a signage, and a larger size is also acceptable.

3. Sensor Module 3-1. Structure

The sensor module 200 is a device allowing the light from the display module 110 to pass therethrough and functioning as an interface for inputting information to the display device 100. The sensor module 200 is a so-called non-contact type sensor module and has a function to detect an input means such as a finger, a palm, a touch pen provided with a resin at a tip thereof and to identify a position of the input means over the sensor module 200 not only in the case where the input means contacts with the sensor module 200 but also in the case where the input means does not contact with the sensor module 200 but is arranged at a vicinity (e.g., within 5 mm, 10 mm, or 20 mm from the outermost surface of the sensor module 200) thereof.

Figure 2:
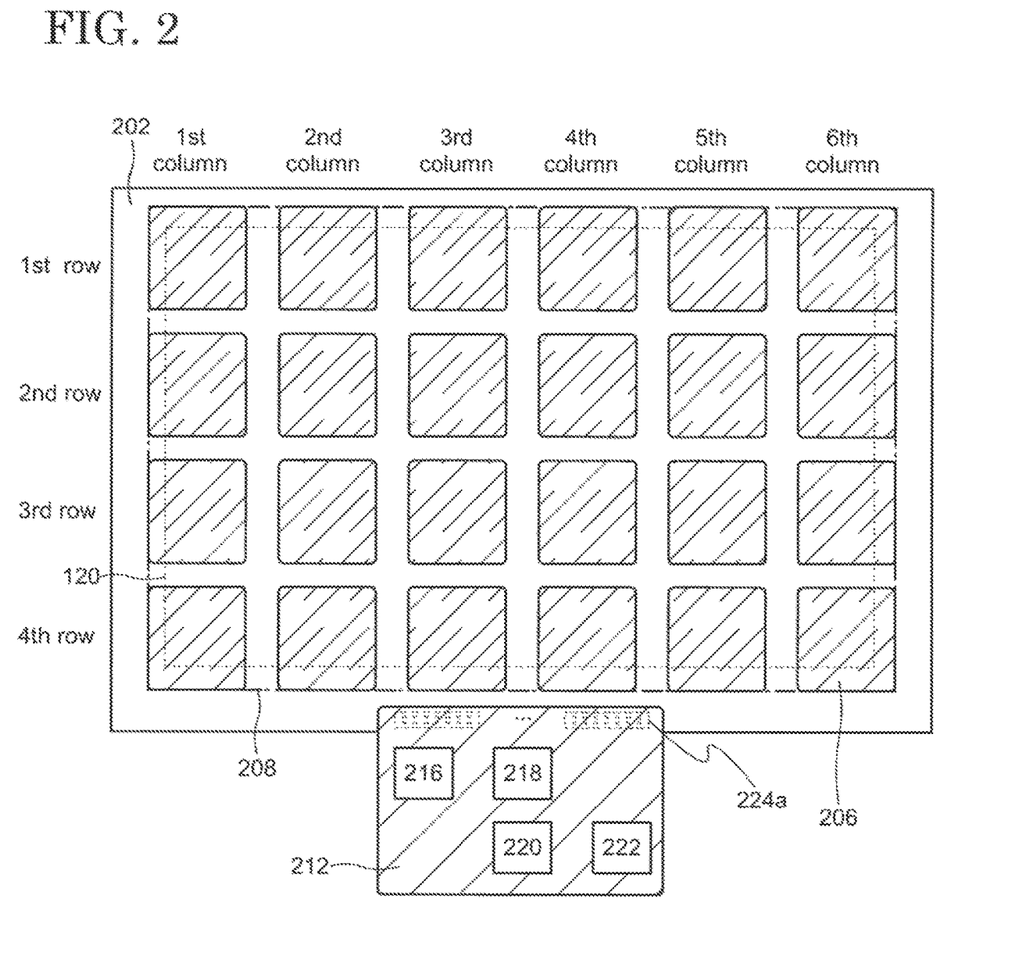
FIG. 2 is a schematic top view of a sensor module according to an embodiment of the present invention.

Specifically, the sensor module 200 has a sensor substrate 202 and a cover substrate 204 opposing the sensor substrate 202 where a plurality of sensor electrodes 206 is disposed between the sensor substrate 202 and the cover substrate 204 as shown in FIG. 1 and a schematic top view (FIG. 2). The plurality of sensor electrodes 206 is arranged in a plurality of rows and a plurality of columns. In the example demonstrated in FIG. 2, the sensor electrodes 206 arranged in a matrix form having 4 rows and 6 columns are disposed in the sensor module 200. The number and size of the sensor electrodes 206 may be appropriately determined according to the size of the display device 100 and detection accuracy required by the sensor module 200. Here, a minimum rectangular region surrounding all of the sensor electrodes 206 is referred to as a sensor region 208.

The sensor substrate 202 and the cover substrate 204 are structured by a material capable of transmitting visible light to allow the image displayed by the display module 110 to be viewed. Hence, the sensor substrate 202 and the cover substrate 204 are structured with glass, quartz, a polymer material such as a polyimide, a polyamide, and a polycarbonate, or the like.

Each of the sensor electrodes 206 overlaps the plurality of pixels 116 and is arranged to overlap at least a part of the display region 120. For example, the sensor electrodes 206 are arranged so that the sensor region 208 shown by the chain line overlaps the whole of the display region 120 as shown in FIG. 2. Although not illustrated, the sensor region 208 and the display region 120 may have the same shape. Alternatively, the sensor region 208 may be smaller than the display region 120. In this case, the sensor electrodes 206 are arranged so that the whole of the sensor region 208 overlaps the display region 120.

The sensor electrode 206 includes a conductive oxide transmitting visible light such as indium-tin oxide (ITO) and indium-zinc oxide (IZO) or a metal (0 valent metal) such as molybdenum, tungsten, tantalum, aluminum, and copper. The sensor electrode 206 may have a single-layer structure or a stacked-layer structure. For example, the sensor electrode 206 may have a structure in which a layer including a conductive oxide and a layer including a metal are stacked. As described below, a sensor wiring is connected to each sensor electrode 206. That is, a plurality of sensor wirings respectively corresponding to the plurality of sensor electrodes 206 is disposed over the sensor substrate 202. Each sensor wiring is exposed over the sensor substrate 202 to form a terminal 224a.

A first connector 212 such as an FPC substrate is electrically connected to the terminals 224a, and the first connector 212 is connected to an external circuit which is not illustrated. A power circuit 216, a detector 218, a processing element 220, an interface 222, and the like may be arranged over the first connector 212. The power circuit 216 converts power supplied from the external circuit to a pulse alternating voltage and supplies the alternating voltage to each sensor electrode 206 through the terminals 224a and the sensor wirings. The detector 218, which is also called an analog front end (AFE), detects a variation in capacitance of the sensor electrodes 206 as a potential fluctuation and digitizes the potential fluctuation to generate a detection signal. The detection signals generated by the detector 218 are input to the processing element 220, and the coordinates representing the position of the input means are generated by the processing element 220 according to the detection signals. The detector 218 and the processing element 220 may be formed as a single integrated circuit (IC) chip. The interface 222 is used for the connection with the external circuit and is configured according to the regulation such as the Universal Serial Bus (USB) and the Serial Peripheral Interface (SPI).

Figure 3:
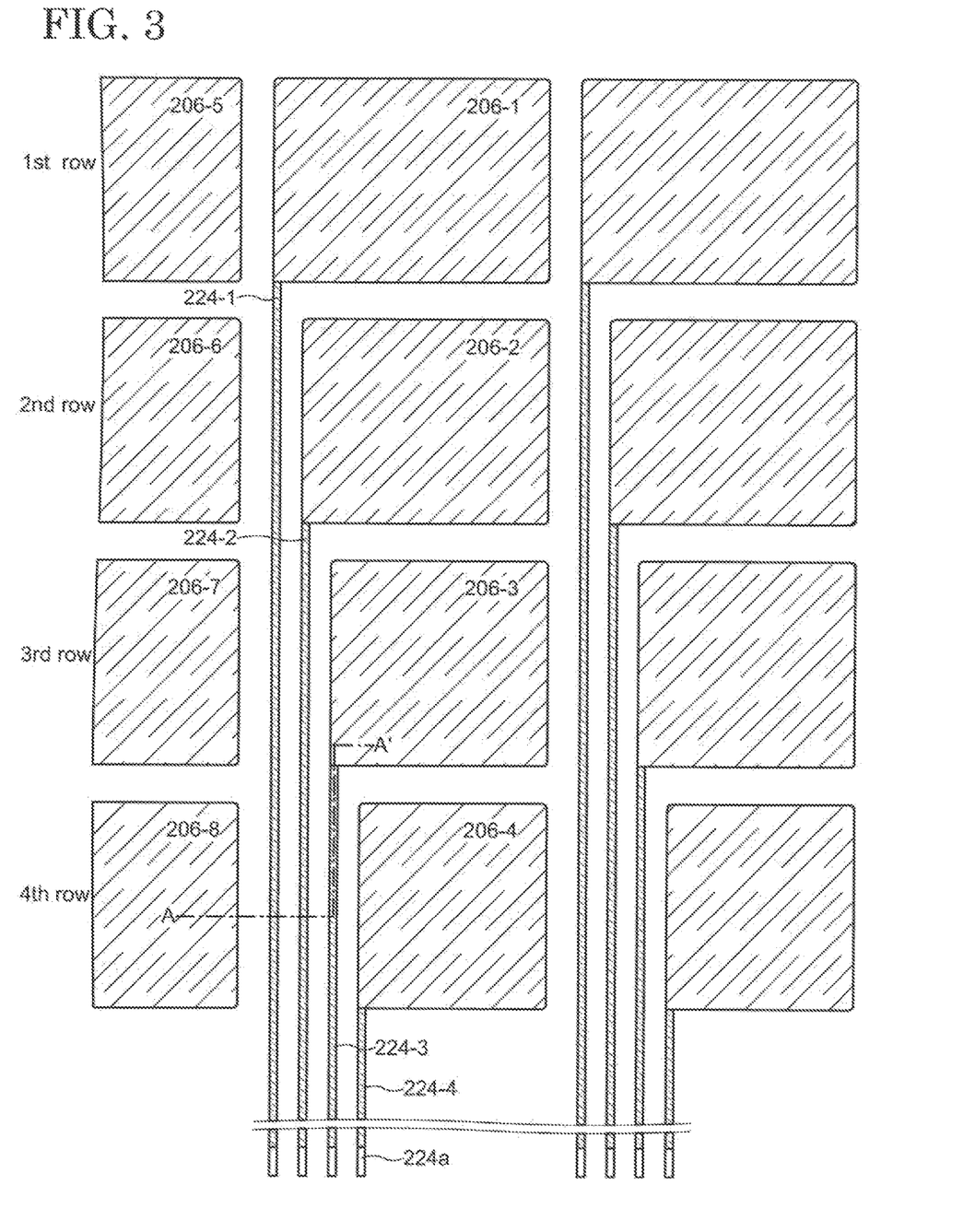
FIG. 3 is a schematic top view of a sensor module according to an embodiment of the present invention.

A schematic top view of a part of the sensor module 200 is shown in FIG. 3. As shown in this drawing, each sensor electrode 206 is provided with the corresponding sensor wiring 224. That is, the sensor module 200 is provided with the same number of sensor wirings 224 as the sensor electrodes 206, and one sensor wiring 224 is electrically connected to one sensor electrode 206. With this structure, the sensor electrodes 206 are electrically connected to the terminals 224a. In addition, each sensor wiring 224 connects the corresponding sensor electrode 206 to the corresponding terminal 224a without passing through any other sensor electrode 206. In other words, one sensor wiring 224 is not connected to the plurality of sensor electrodes 206, and, in a similar way, one sensor electrode 206 is not connected to the plurality of sensor wirings 224. In the example shown in FIG. 3, the sensor wirings 224-1 to 224-4 correspond to and are electrically connected to the sensor electrodes 206-1 to 206-4, respectively.

As described above, the sensor electrodes 206 are applied with a pulse alternating voltage of the same phase through the sensor wirings 224. When the input means approaches the sensor electrodes 206, virtual capacitor elements are formed between the input means and the sensor electrodes 206, and the potential of each sensor electrode 206 is accordingly fluctuated. This potential fluctuation is detected and digitized by the detector 218, and the coordinates of the position to which the input means comes close are identified in the processing element 220 on the basis of the amount of the potential fluctuation and the position (coordinates) of each sensor electrode 206. Thus, the sensor module 200 functions as an electrostatic capacitive type (self-capacity type) and non-contact type sensor (hover sensor).

Figure 4A:
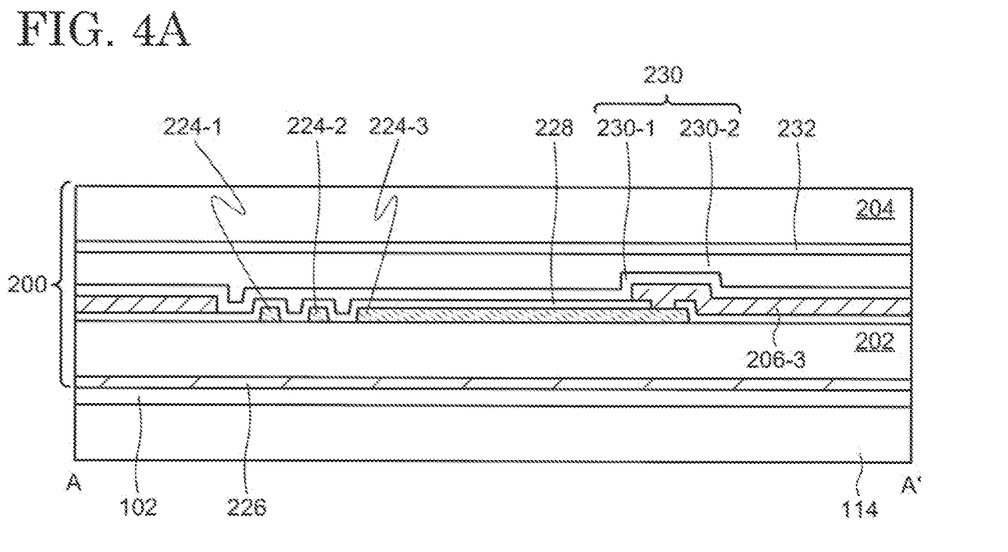
FIG. 4A is a schematic cross-sectional view of a sensor module according to an embodiment of the present invention.

A schematic view of a cross-section along the chain line A-A' in FIG. 3 is shown in FIG. 4A. The counter substrate 114 of the display module 110 is also depicted in FIG. 4A. As shown in FIG. 4A, the display module 110 and the sensor module 200 are fixed to each other with an adhesive layer 102 transmitting visible light. Note that, when the display module 110 is a liquid crystal display device, a polarizing plate and the like are disposed over the counter substrate 114.

As an optional component, a noise-shielding layer 226 may be arranged between the sensor substrate 202 and the counter substrate 114 to shield any electrical influence from the display module 110. The noise-shielding layer 226 may be provided over or under the adhesive layer 102. The noise-shielding layer 226 includes a light-transmitting oxide having conductivity such as ITO and IZO or a metal. In the latter case, a mesh metal film having a plurality of openings may be used as the noise-shielding layer 226 to allow visible light to pass therethrough. The noise-shielding layer 226 is disposed to overlap the plurality of sensor electrodes 206. A second connector 210 such as an FPC substrate is electrically connected to the noise-shielding layer 226 (see FIG. 1), and a pulse alternating voltage of the same phase as the potential applied to the sensor electrodes 206 is applied to the noise-shielding layer 226. Hence, the noise-shielding layer 226 is always equipotential with the sensor electrodes 206.

3-2. Arrangement of Sensor Electrodes and Sensor Wirings

Figure 4B:
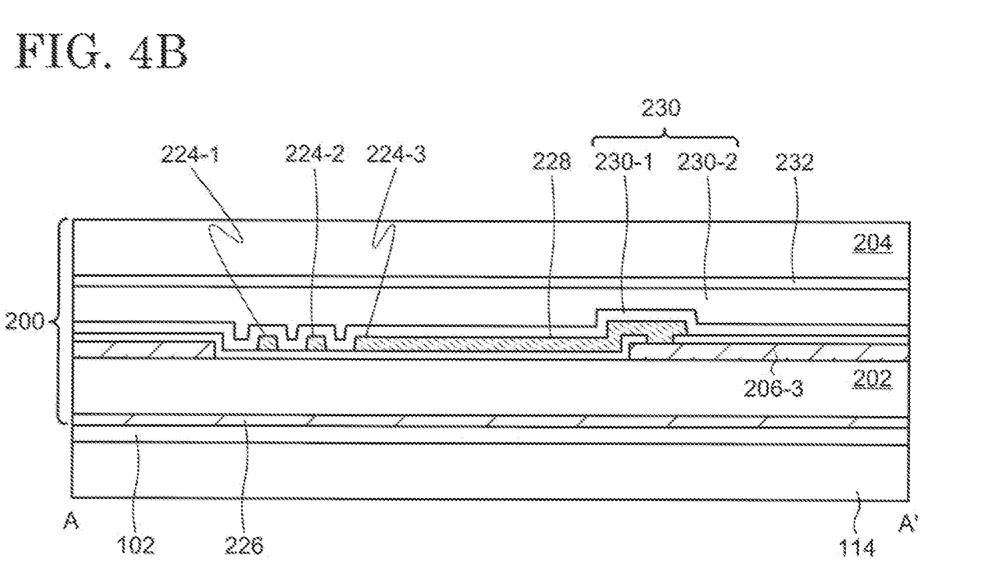
FIG. 4B is a schematic cross-sectional view of a sensor module according to an embodiment of the present invention.

The sensor wirings 224 are disposed over the sensor substrate 202 directly or through an insulating undercoat which is not illustrated, over which the sensor electrodes 206 are arranged. Here, the sensor electrodes 206 may be directly disposed over the sensor wirings 224 or may be arranged through an interlayer insulating film 228 including a silicon-containing inorganic compound such as silicon oxide and silicon nitride as shown in FIG. 4A. In the latter case, the sensor electrodes 206 and the sensor wirings 224 are electrically connected through openings formed in the interlayer insulating film 228. Note that there is no limitation to the vertical relationship between the sensor electrodes 206 and the sensor wirings 224, and the sensor wirings 224 may be arranged over the sensor electrode 206 as shown in FIG. 4B.

Figure 5:
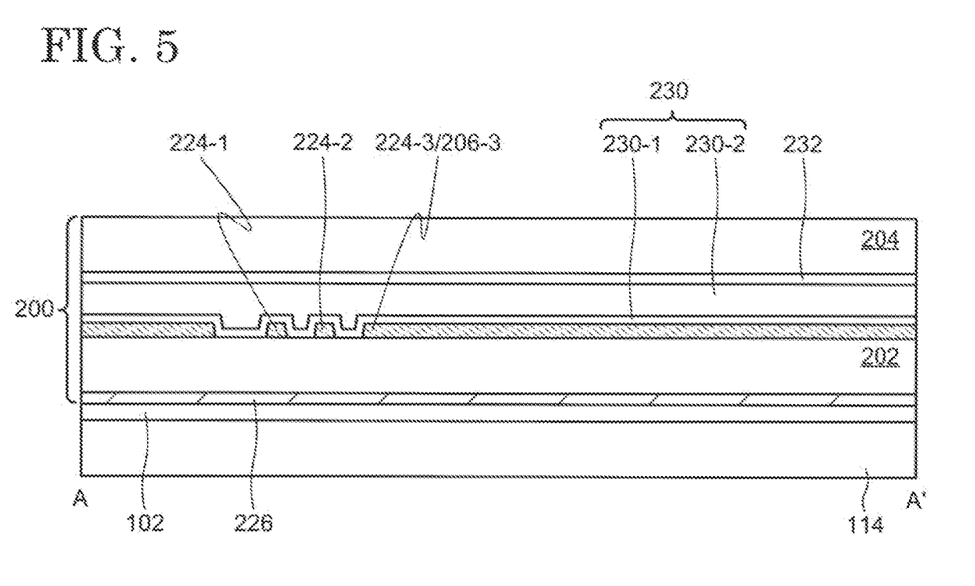
FIG. 5 is a schematic cross-sectional view of a sensor module according to an embodiment of the present invention.

Alternatively, the sensor electrodes 206 and the sensor wirings 224 may be formed so as to exist in the same layer as shown in FIG. 5. That is, the sensor electrodes 206 and the sensor wirings 224 having the same composition may be simultaneously formed in the same process. In this case, the sensor electrodes 206 and the sensor wirings 224 are preferred to include a metal in order to avoid an increase in resistance of the sensor wirings 224. Alternatively, the sensor electrodes 206 and the sensor wirings 224 may have a stacked structure of a film including a light-transmitting oxide having conductivity and a film including a metal.

Figure 6:
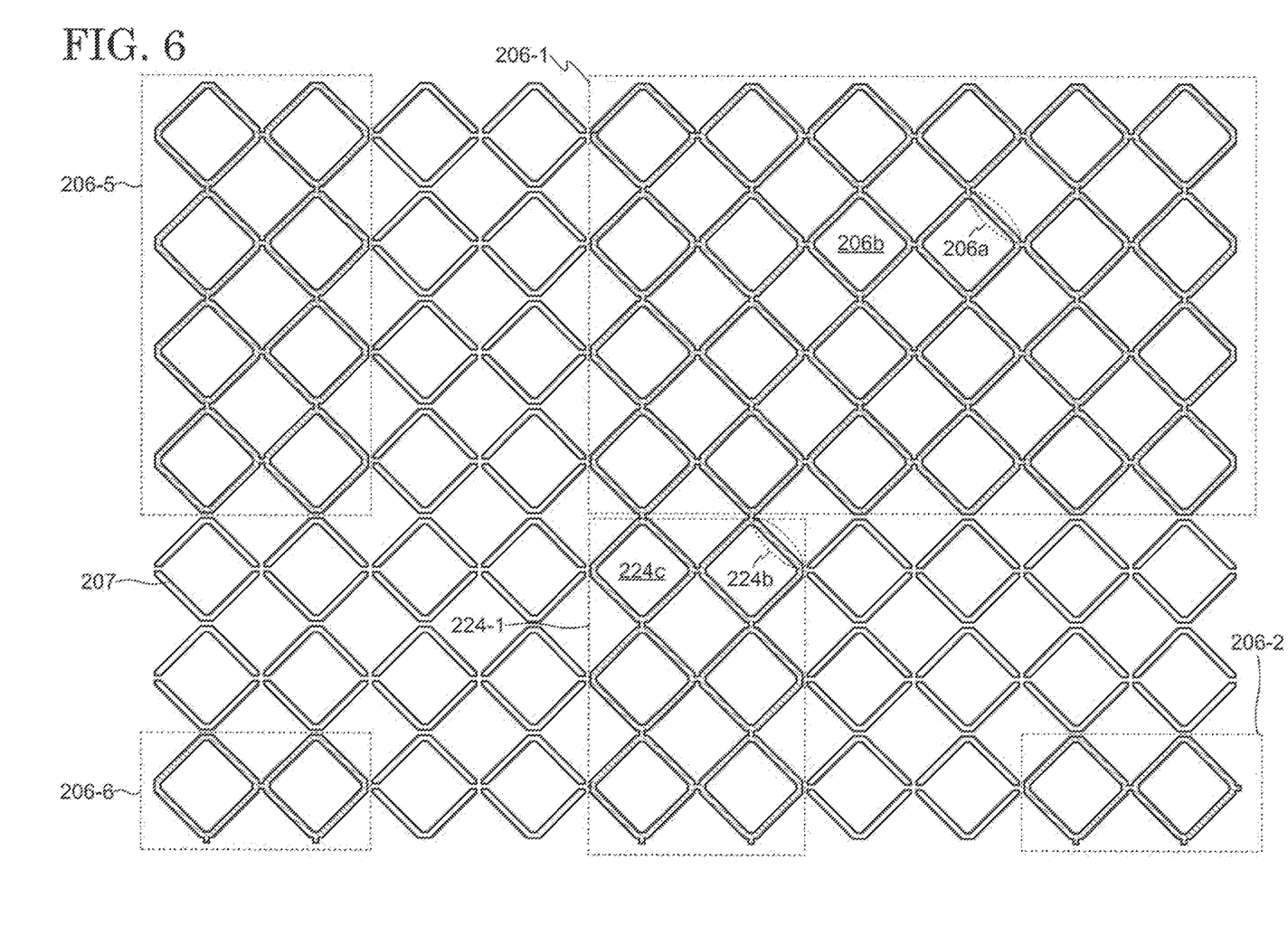
FIG. 6 is a schematic top view of a sensor module according to an embodiment of the present invention.

When the sensor electrodes 206 include a metal, it is preferred that the sensor electrodes 206 be formed in a mesh shape in order to prevent any influence on the image displayed by the display module 110. When the sensor electrodes 206 have a stacked structure of a film including a light-transmitting oxide having conductivity and a film including a metal, both films or the latter film may be formed in a mesh form. Specifically, each sensor electrode 206 is configured to have a plurality of openings 206b formed by frames 206a as shown in FIG. 6 which is an enlarged view of a part of FIG. 5, allowing the image to be viewed through the openings 206b. With this structure, sufficient conductivity can be secured in the sensor electrodes 206 and the image from the display module 110 can be viewed. Furthermore, the sensor wirings 224 may also be configured to have a mesh form as shown in FIG. 6. It is preferred that the mesh patterns of the sensor electrodes 206 and the sensor wirings 224 be the same or substantially the same as each other. Namely, a width of the frames 206a structuring the mesh form of the sensor electrode 206 is preferred to be the same or substantially the same as a width of the frames 224b structuring the mesh form of the sensor wiring 224. In a similar way, it is preferred that the shape, size, and pitch of the openings 206b of the mesh of the sensor electrode 206 be respectively the same or substantially the same as the shape, size, and pitch of the openings 224c of the mesh of the sensor wiring 224. Generation of moire can be prevented by providing the sensor wirings 224 with the same mesh form as that of the sensor electrodes 206.

In addition, it is preferred to arrange a plurality of dummy electrodes 207 existing in the same layer as the sensor electrodes 206 and the sensor wirings 224 between the adjacent sensor electrodes 206 and between the sensor electrode 206 and the sensor wiring 224 as shown in FIG. 6. The plurality of dummy electrodes 207 is not connected to each other and is electrically insulated from the sensor electrodes 206 and the sensor wirings 224 to exist in an electrically floating state. It is preferred that the plurality of dummy electrodes 207 have the same or substantially the same width as the frame 206a and the frame 224b and that a direction in which at least a part of each dummy electrode 207 extends be parallel to a part of the frames 206a and a part of the frames 224b. Moreover, the pitch of the plurality of dummy electrodes 207 is preferred to be the same or substantially the same as the pitches of the openings 206b and 224c. Generation of moire can be effectively prevented because a substantially even optical property can be obtained along the whole of the sensor region 208 in the layers in which the sensor electrodes 206, the sensor wirings 224, and the dummy electrodes 207 are formed. Note that, although a hatching different from the hatching of the sensor electrodes 206 and the sensor wirings 224 is provided to the dummy electrodes 207, these components may have the same composition and the same layer structure. Moreover, the dummy electrode 207 shown in FIG. 6 is bent to have a doglegged shape, and the dummy electrode 207 may be further divided at the bent portion. Furthermore, in addition to such a shape, it is also possible to employ a structure in which a narrow line forming the dummy electrode 207 is divided at its middle portion.

Here, as can be understood from FIG. 3, FIG. 4A, and FIG. 4B, each sensor wiring 224 is arranged so as not to overlap at least all of the sensor electrodes 206 other than the sensor electrode 206 connected to the sensor wiring 224. In other words, each sensor wiring 224 is arranged so as to be entirely exposed from at least all of the sensor electrodes 206 other than the sensor electrode 206 connected to the sensor wiring 224. For example, when focus is placed on the sensor wiring 224-3 connected to the sensor electrode 206-3 in the third row, the sensor wiring 224-3 does not overlap the sensor electrodes 206 other than this sensor electrode 206-3 and is entirely exposed from the sensor electrodes 206 other than the sensor electrode 206-3 although the sensor wiring 224-3 may overlap the sensor electrode 206-3 connected thereto (see FIG. 4A and FIG. 4B).

Alternatively, each sensor wiring 224 is arranged so as not to overlap all of the sensor electrodes 206 including the sensor electrode 206 connected to the sensor wiring 224 as can be understood from FIG. 3 and FIG. 5. In other words, each sensor wiring 224 is arranged so as to be entirely exposed from all of the sensor electrodes 206 including the sensor electrode 206 connected to the sensor wiring 224.

These configurations and arrangements of the sensor electrodes 206 and the sensor wirings 224 prevent the formation of a capacitance (parasitic capacitance) between the sensor wirings 224 and the sensor electrodes 206. When focus is placed on the sensor wiring 224-1 connected to the sensor electrode 206-1 in the first row (see FIG. 3), this sensor wiring 224-1 does not overlap the sensor electrodes 206-2 to 206-4 and is entirely exposed therefrom. Hence, although the sensor wiring 224-1 may form a capacitance with the sensor electrodes 206-2 to 206-4, its influence is small. Thus, when the input means approaches the sensor electrode 206-1 causing a fluctuation of the potential of the sensor wiring 224-1, this potential fluctuation does not influence other sensor electrodes 206. As a result, the detection signal of the sensor electrode 206-1 is not dispersed to other sensor electrodes 206, and the detection position (coordinates) of the input means can be accurately identified.

A protection film 230 may be disposed over the sensor wirings 224 and the sensor electrodes 206 as an optional component. The protection film 230 has a single-layer or stacked-layer structure and is structured by a film including a silicon-containing inorganic compound, a resin such as an epoxy resin, an acrylic resin, and a silicone resin, or the like. In FIG. 4A to FIG. 5, the protection film 230 in which a first protection film 230-1 including an inorganic compound and a second protection film 230-2 including a resin are stacked is illustratively demonstrated. The stacking order of the first protection film 230-1 and the second protection film 230-2 is not limited, and the first protection film 230-1 may be stacked over the second protection film 230-2. The first protection film 230-1 including a resin also functions as a planarization film. The cover substrate 204 is fixed over the protection film 230 via an adhesive layer 232 transmitting visible light.

3-3. Modified Example (1) Modified Example 1

In the aforementioned arrangement of the sensor wirings 224, when the distance between the sensor wiring 224 and the sensor electrode 206 in the adjacent column fairly decreases, the sensor wirings 224 are readily affected by the potential fluctuation of the sensor electrodes 206 in the adjacent column. Moreover, this influence increases for the sensor wirings 224 connected to the sensor electrodes 206 far from the terminals 224a. For instance, in each column, the sensor wiring 224-1 connected to the sensor electrode 206-1 arranged in the first row farthest from the terminal 224a is affected by the potential fluctuations of all of the sensor electrodes 206 in the adjacent column in the example shown in FIG. 3, because this sensor wiring 224-1 is adjacent to all of the sensor electrodes 206-5 to 206-8 in the adjacent column. On the other hand, the sensor wiring 224-4 connected to the sensor electrode 206-4 in the fourth row closest to the terminal 224a has no adjacent sensor electrode 206 in the row direction.

Figure 7:
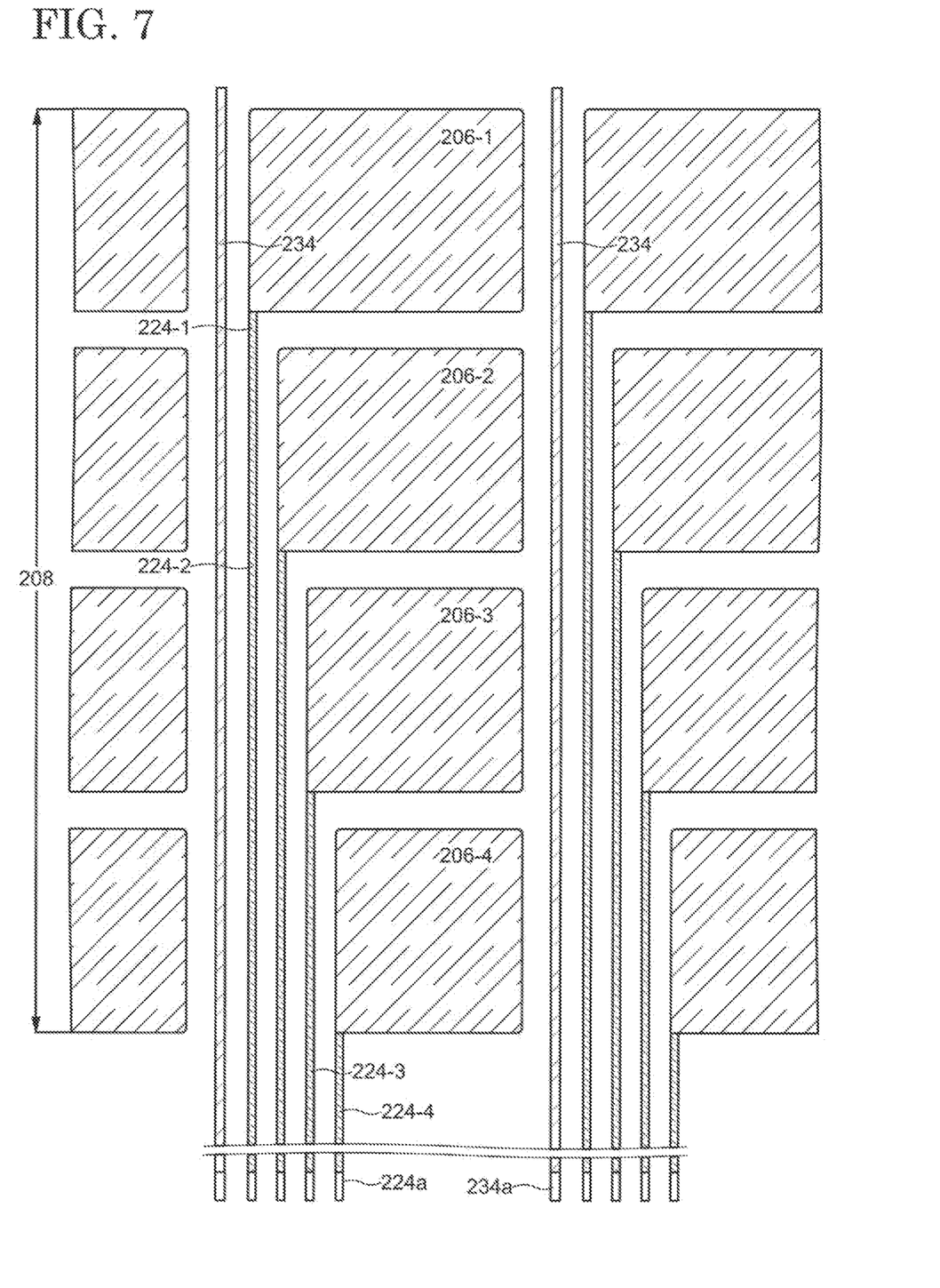
FIG. 7 is a schematic top view of a sensor module according to an embodiment of the present invention.

Hence, a shield wiring 234 may be arranged in order to decrease the influence of the sensor electrodes 206 in the adjacent column. Specifically, as shown in FIG. 7, one or a plurality of shield wirings 234 extending in the column direction as a whole and crossing a plurality of rows is arranged in the sensor module 200. Each shield wiring 234 is spaced away from the sensor electrodes 206. When a plurality of shield wirings 234 is provided, the same number of shield wirings 234 as the columns or the shield wirings 234 whose number is obtained by subtracting 1 from the number of columns may be arranged so that the sensor electrodes 206 and the shield wirings 234 alternate in each row, for example.

Each shield wiring 234 is exposed at a vicinity of the edge portion of the sensor substrate 202 to form a terminal 234a and is applied with a pulse alternating voltage of the same phase as the sensor electrodes 206 from the power circuit 216. Since the shield wirings 234 do not need to contribute to the determination of the coordinates of the input means, the shield wirings 234 may not be connected to the detector 218. On the other hand, an edge portion of the shield wiring 234 opposite to the terminal 234a may be located in the sensor region 208 or outside the sensor region 208. Each shield wiring 234 may also be configured to include a light-transmitting oxide having conductivity or a metal. In the latter case, the shield wirings 234 may be configured to have a mesh shape similar to the sensor electrodes 206 and the shield wirings 234, by which an image can be viewed through the sensor electrodes 206 and the shield wirings 234 and the generation of moire can be prevented.

The arrangement of the shield wirings 234 allows the shield wirings 234 to each exist between the sensor wirings 224 and the sensor electrodes 206 arranged in the adjacent column, thereby decreasing the influence of the potential fluctuation of the sensor electrodes 206 in the adjacent column. As a result, the coordinates of the input means can be more accurately identified.

(2) Modified Example 2

In the examples demonstrated in FIG. 3 and FIG. 7, the sensor module 200 is configured so that the area of the sensor electrode 206 increases with increasing distance from the terminal 224a. Employment of such an arrangement simplifies the layout of the sensor wirings 224 and allows the sensor electrodes 206 to be arranged in a high density.

Figure 8:
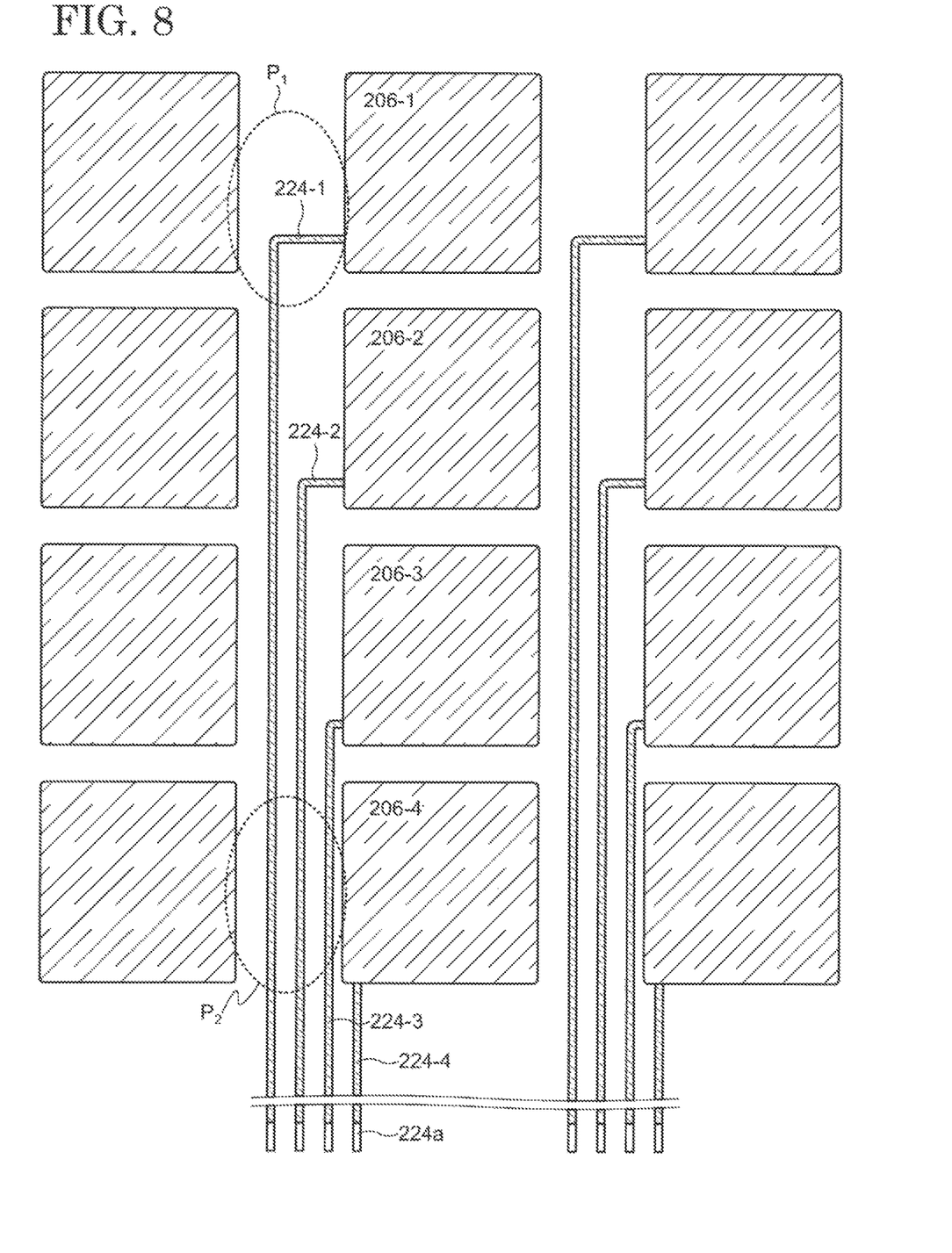
FIG. 8 is a schematic top view of a sensor module according to an embodiment of the present invention.

However, the structure of the sensor module 200 is not limited thereto, and the sensor module 200 may be configured so that all of the sensor electrodes 206 have the same shape and area as shown in FIG. 8. The formation of the sensor electrodes 206 having the same area results in a decrease in row dependence of the amount of the potential fluctuation caused by the approach of the input means, thereby allowing more accurate identification of the coordinates of the input means.

Figure 9:
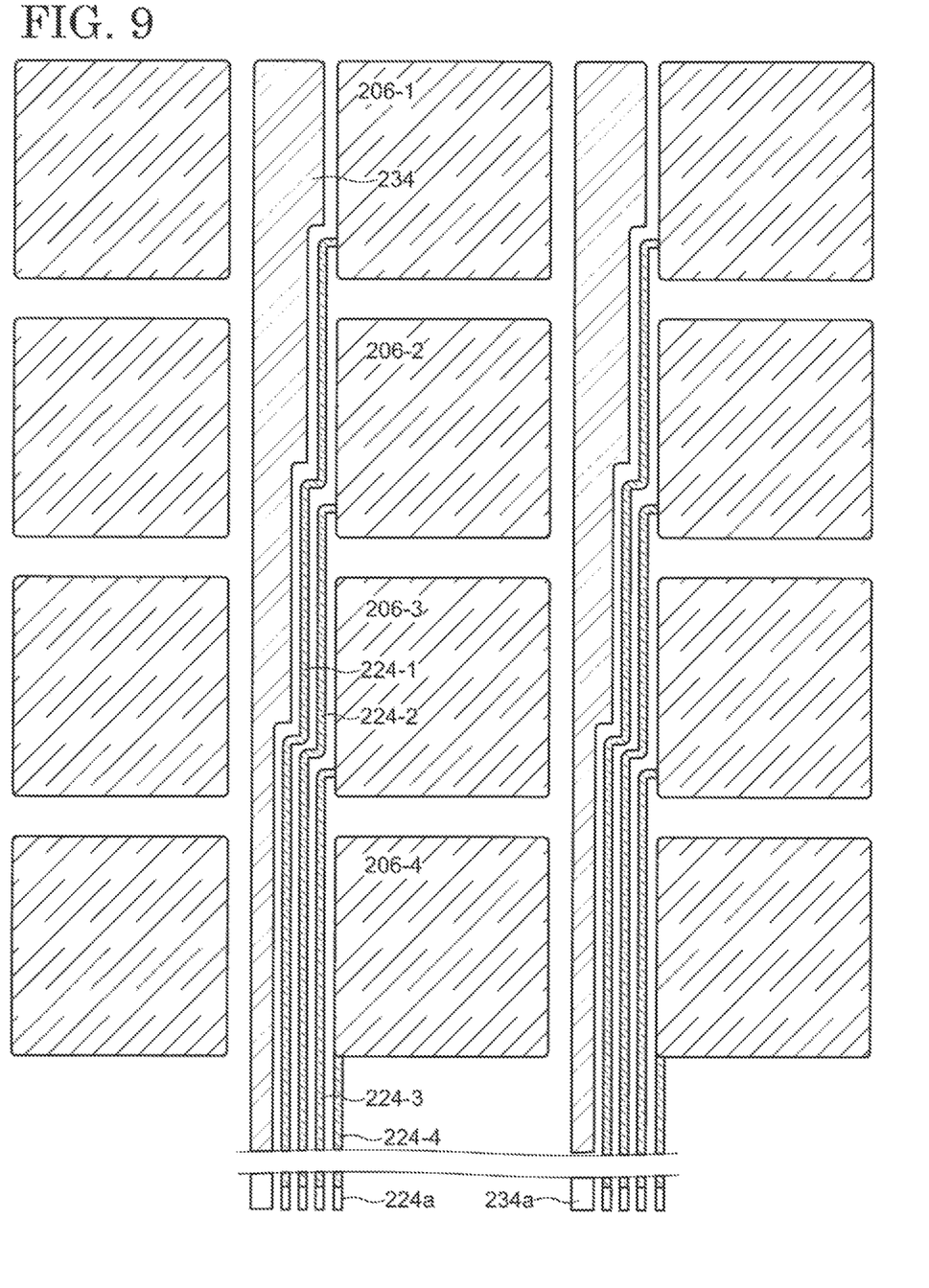
FIG. 9 is a schematic top view of a sensor module according to an embodiment of the present invention.

As can be understood from FIG. 8, the area occupied by the sensor wirings 224 between the sensor electrodes 206 adjacent in the row direction decreases with increasing distance from the terminals 224a in such an arrangement. Hence, the shield wirings 234 may be arranged similar to the Modified Example 1 so that the width thereof (i.e., the length in the row direction) increases stepwise or continuously with increasing distance from the terminal 224a as shown in FIG. 9. Such an arrangement of the shield wirings 234 with variable widths in the row direction allows the electric field between the approaching input means and the sensor area 208 to be uniform without causing distortion, and a part of the electric filed overlapping the sensor electrodes 206 is detected as a capacitance variation, which enables the row-independent detection without variation.

(3) Modified Example 3

As described above, the sensor electrodes 206 are arranged in the plurality of columns and the plurality of rows in the sensor module 200. The sensor wirings 224 connected to these sensor electrodes 206 extend toward a side of the sensor substrate 202 to form the terminals 224a. Hence, the closer to the terminals 224a the sensor wirings 224 are, the higher the density of the sensor wirings 224 is. Therefore, when the input means approaches the position $P_1$ far from the terminals 224a as shown in FIG. 8, it is possible to identify the accurate coordinates of the input means because only the potential of the sensor electrode 206-1 in the first row close to the position $P_1$ and the potential of the sensor wiring 224-1 connected thereto fluctuate. However, when the input means approaches the position $P_2$ close to the terminals 224a, not only does the potential fluctuation occur on the sensor electrode 106-4 in the fourth row, but also virtual capacitance elements may be formed on the sensor wirings 224 connected to other sensor electrodes 206. Accordingly, the accurate coordinates of the input means may not be able to be identified because the potential of the sensor electrodes 206 other than the sensor electrode 206-4 in the fourth row may fluctuate.

Figure 10:
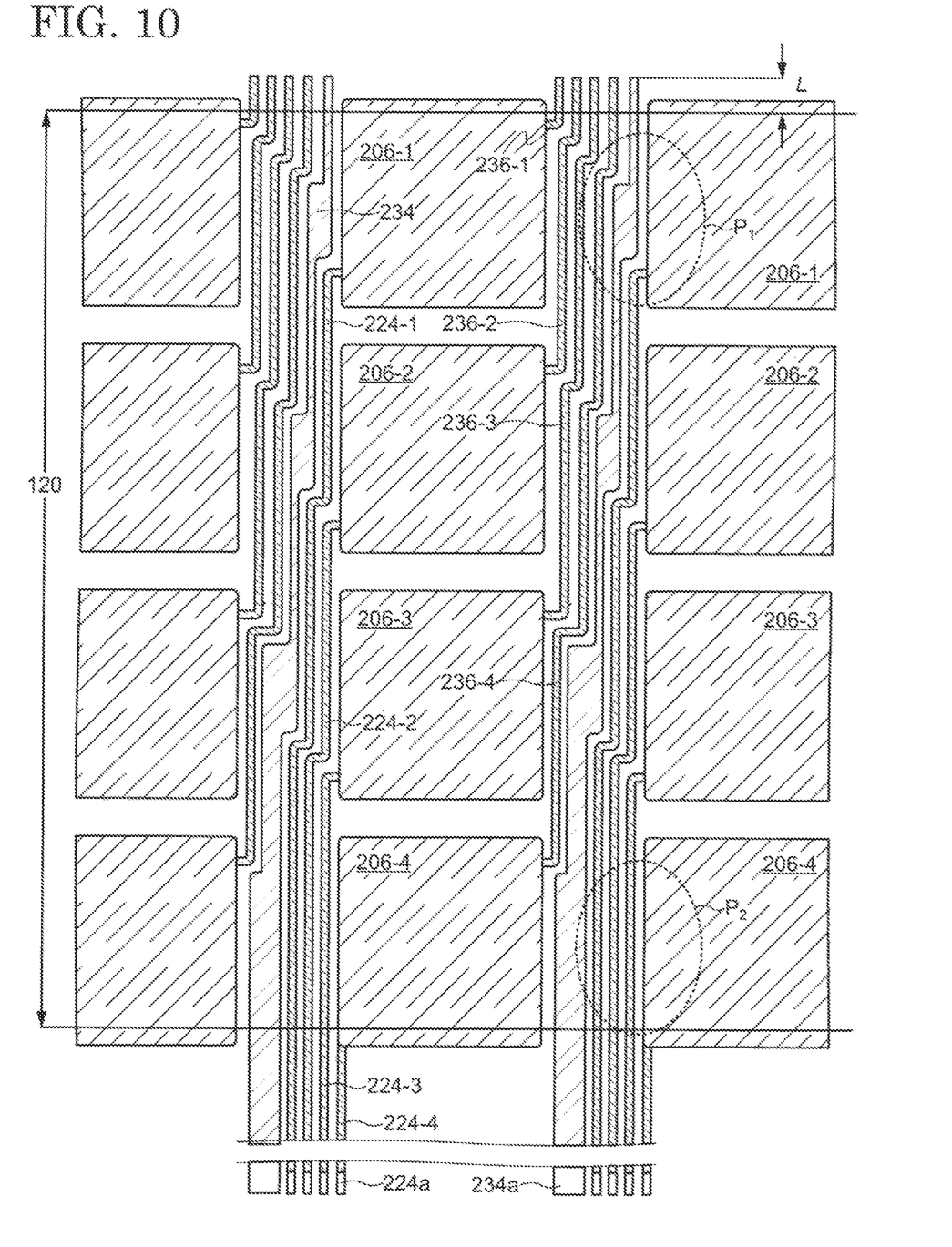
FIG. 10 is a schematic top view of a sensor module according to an embodiment of the present invention.

Therefore, an auxiliary wiring 236 different from the sensor wiring 224 may be provided to each sensor electrode 206 as shown in FIG. 10. Specifically, a plurality of auxiliary wirings 236 is respectively provided to the corresponding plurality of sensor electrodes 206. One auxiliary wiring 236 is selectively connected to one sensor electrode 206 and extends in the direction opposite to the terminal 224a. The auxiliary wiring 236 is not connected to other conductive components other than the sensor electrode 206 connected thereto. Hence, the pulse alternating voltage of the same phase as the sensor electrodes 206 is applied to the auxiliary wirings 236. Each auxiliary wiring 236 may be configured to include a light-transmitting oxide having conductivity or a metal. In the latter case, the formation of both of the sensor electrodes 206 and the auxiliary wirings 236 to have the mesh shape allows the images to be viewed through the sensor electrodes 206 and the auxiliary wirings 236 and also prevents the moire generation.

Similar to the sensor wirings 224, each auxiliary wiring 236 does not overlap at least all of the sensor electrodes 206 other than the sensor electrode 206 connected thereto. That is, each auxiliary wiring 236 is exposed from at least all of the sensor electrodes 206 other than the sensor electrode 206 connected thereto. Alternatively, similar to the sensor wirings 224, each auxiliary wiring 236 does not overlap all of the sensor electrodes 206 when the sensor electrodes 206 and the auxiliary wirings 236 exist in the same layer. Namely, each auxiliary wiring 236 is exposed from all of the sensor electrodes 206.

This arrangement of the auxiliary wirings 236 makes the wiring density, that is, the summation of the areas of the sensor wirings 224 and the auxiliary wirings 236 to be substantially constant in the column direction. Hence, when the input means approaches the position $P_2$ close to the terminals 224a, for example, not only does the largest potential fluctuation occur on the sensor electrode 206-4 in the fourth row, which is closest to its coordinates, but also a secondary potential fluctuation occurs on the sensor wirings 224 arranged close to the sensor electrode 206-4 in the fourth row and on the sensor electrodes 206 arranged in the first to third rows and connected thereto. In a similar way, when the input means approaches the position $P_1$ far from the terminals 224a, not only does the potential fluctuation occur on the sensor electrode 206 arranged in the first row and close to its coordinates, but also a secondary potential fluctuation occurs on the auxiliary wirings 236 connected to the sensor electrodes in the second to fourth rows, which eventually causes a secondary potential fluctuation on the sensor electrodes 206 in the second to fourth rows. That is, while sensing the large potential fluctuation on the sensor electrode 206 to which the input means comes close, substantially the same secondary potential fluctuation can be generated on other sensor electrodes 206 of the column in which this sensor electrode 206 is arranged, regardless of the coordinates of the input means. As a result, the dependence of the secondary potential fluctuation on the coordinates of the input means is canceled, by which the coordinates of the input means can be accurately identified.

Preferably, the auxiliary wirings 236 are arranged so that the edge portions of the auxiliary wirings 236 on the opposite side with respect to the terminals 224a (the edge portions on the opposite side to the edge portions connected to the sensor electrodes 206) (FIG. 10) are located outside the sensor region 208 (see FIG. 1). Alternatively, the auxiliary wirings 236 are arranged so that these edge portions are located outside the sensor region 208 and outside the display region 120. A length L of the portion of the auxiliary wiring 236 extending toward the opposite side with respect to the terminal 224a from an edge portion of the sensor region 208 or the display region 120 is preferably equal to or more than 1 mm and equal to or less than 1 cm. The virtual capacitance formed between the auxiliary wirings 236 and the input means can be secured by controlling the positions of the edge portions of the auxiliary wirings 236 in this way even when the input means approaches the edge portion of the display region 120. Therefore, it is possible to maintain the detection accuracy the same as that of the other region of the sensor region 208 (e.g., the vicinity of the center).

In addition, the sensor wirings 224 can each function as a sensor electrode because the pulse alternating voltage is applied although the widths thereof are small. In the case where the sensor electrode 206 and the sensor wiring 224 are collectively considered as one sensor electrode, there is still a difference in size of the sensor electrodes 206 when viewed in the row direction even if the structure of FIG. 9 is employed. On the other hand, the auxiliary wirings 236 are further added to the sensor electrodes 206 and extend in the direction away from the terminals 224a in the structure of FIG. 10. That is, the auxiliary wiring 236-4 connected to the sensor electrode 206-4 closest to the detector 218 extends in the direction away from the detector 218 and passes between the other sensor electrodes 206, while the auxiliary wiring 236-1 connected to the sensor electrode 206-1 located at the farthest position from the detector 218 is extremely short. Since this structure also allows the sensor wiring 224 and the auxiliary wiring 236 to function as a part of the sensor electrode 206 (the sensor electrode connected to the detector 218), the areas of the portions functioning as sensor electrodes are substantially the same between the sensor electrodes 206, and the capacitance difference caused by the difference in distance from the detector 218 is reduced. Note that a structure may be employed in which no auxiliary wiring is provided to the sensor electrode 206-1 at the position farthest from the detector 218.

(4) Modified Example 4

Figure 11:
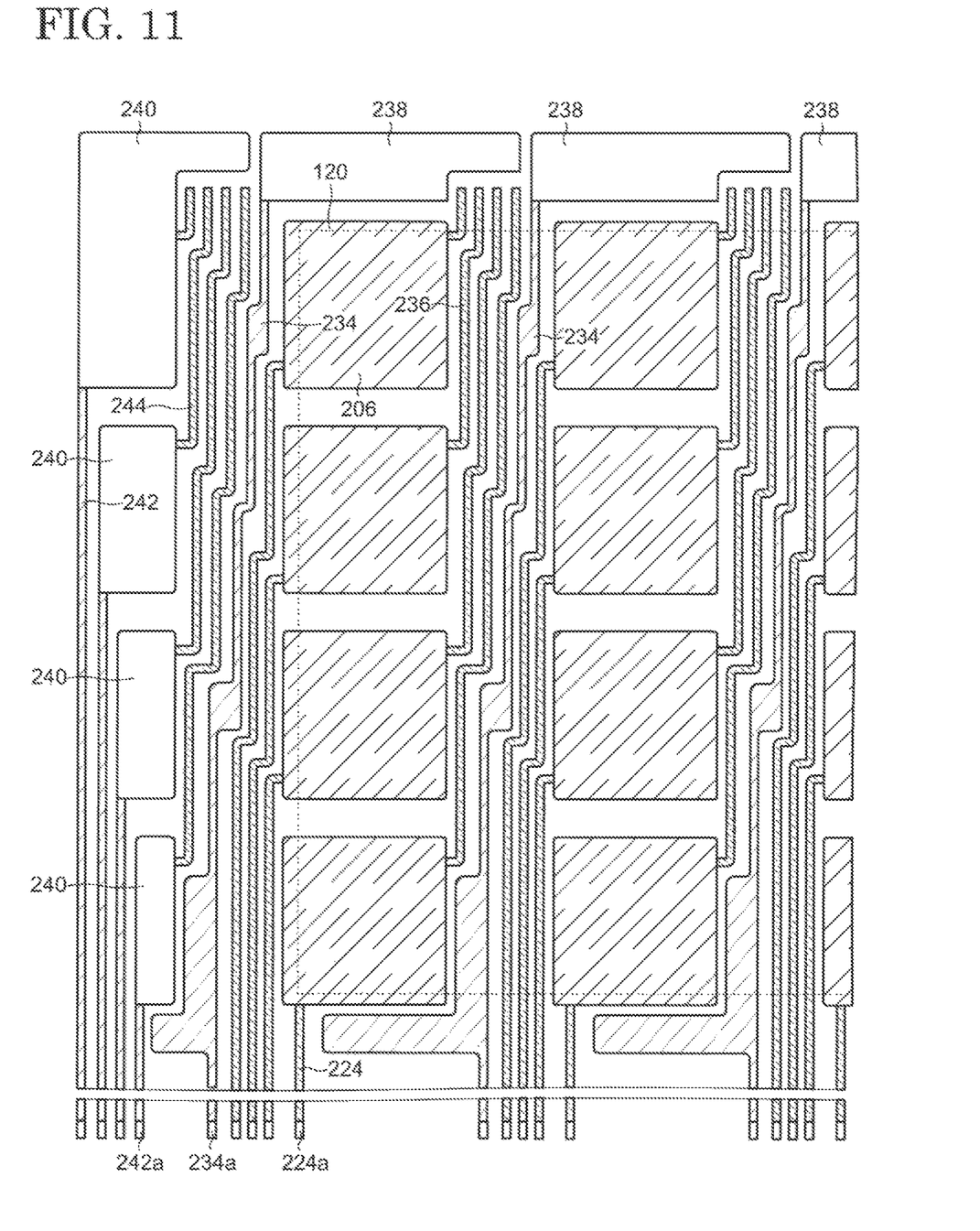
FIG. 11 is a schematic top view of a sensor module according to an embodiment of the present invention.
Figure 12:
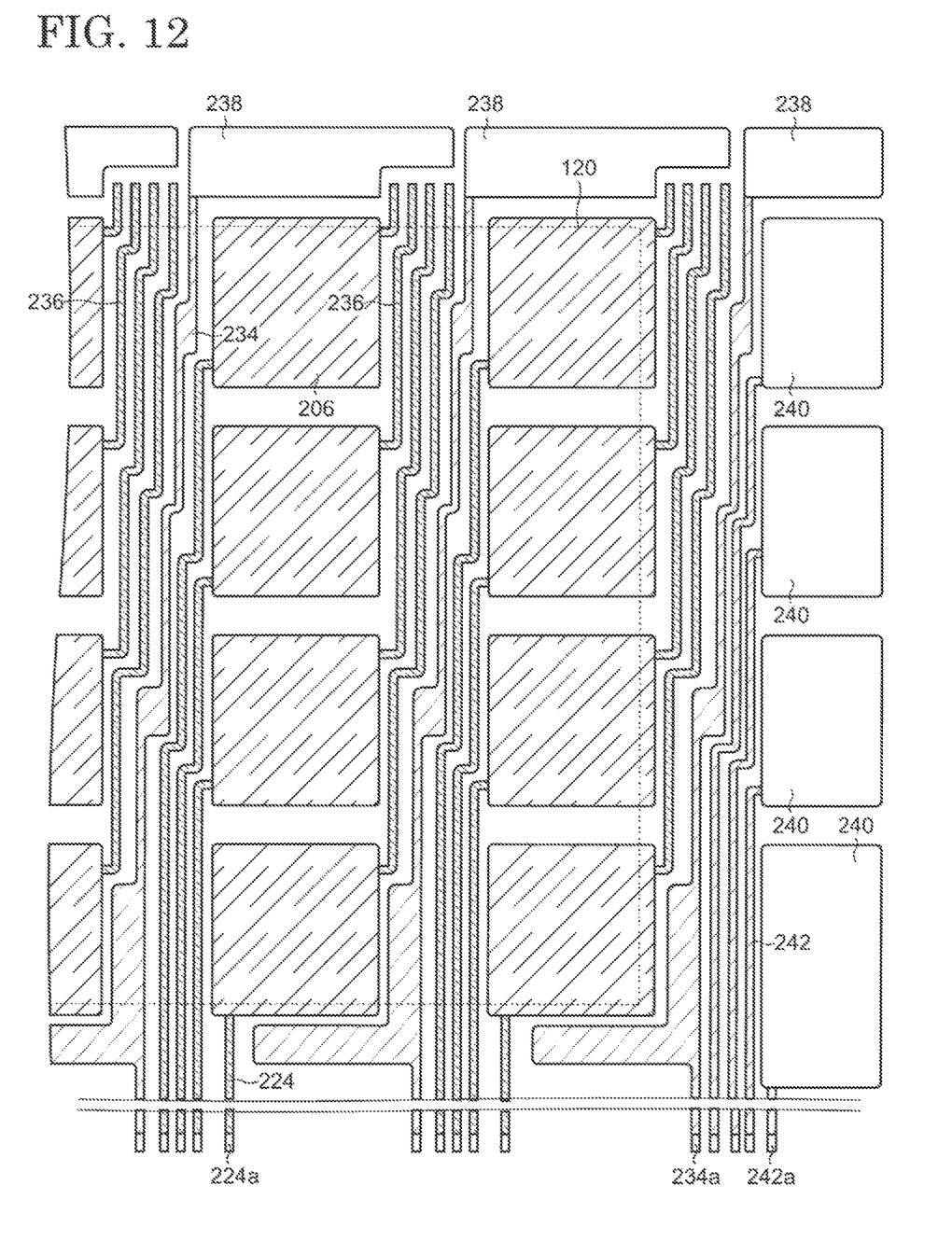
FIG. 12 is a schematic top view of a sensor module according to an embodiment of the present invention.

A non-contact type sensor is electrically influenced by the display module 110 more easily compared with the traditional contact type sensor. In order to reduce this influence, a plurality of shield electrodes may be arranged around the sensor region 208. A specific structure is shown in FIG. 11 and FIG. 12. FIG. 11 is a schematic top view including two sides of the sensor substrate 202, while FIG. 12 is a schematic top view of a counter region to the region shown in FIG. 11 with respect to the sensor region 208 as a standard.

As shown in these drawings, one shield electrode (first shield electrode) 238 may be disposed in each column. In each column, the shield electrode 238 is arranged on the opposite side to the terminals 244a with respect to the sensor region 208 (that is, all of the sensor electrodes 206) as a standard. The shield electrodes 238 are provided so as not to overlap the display region 120. In other words, all of the plurality of pixels 116 is exposed from the shield electrodes 238. When the edge portions of the auxiliary wirings 236 connected to the sensor electrodes 206 are arranged outside the sensor region 208, the shapes and the arrangement of the shield electrodes 238 may be adjusted so that these edge portions overlap the shield electrode 238 disposed in the same column in the row direction and the column direction. The shield electrodes 238 are also applied with the pulse alternating voltage of the same phase as the sensor electrodes 206. Hence, the shield electrodes 238 may be respectively connected to the aforementioned plurality of shield wirings 234. Since the shield electrodes 238 do not contribute to the identification of the coordinates of the input means, they may not be connected to the detector 218.

Alternatively, a pair of shield electrodes (second shield electrodes) 240 may be arranged in each row together with the shied electrodes 238 or instead of the shied electrodes 238. The pair of shield electrodes 240 is arranged to sandwich all of the sensor electrodes 206 in each row. The shield electrodes 240 are also disposed so as not to overlap the display region 120. Therefore, all of the pixels 116 are exposed from the shield electrodes 240. The shield electrodes 240 are also applied with the pulse alternating voltage of the same phase as the sensor electrodes 206. Hence, the shield wiring 242 is electrically connected to each shield electrode 240. The shied wirings 242 are exposed at a vicinity of the edge portion of the sensor substrate 202 to form terminals 242a. The terminals 242a are connected to the first connector 212, by which the shield wirings 242 can be supplied with a voltage from the power circuit 216. Since the shield electrodes 240 also do not contribute to the identification of the coordinates of the input means similar to the shield electrodes 238, they may not be connected to the detector 218. Although not illustrated, each shield wiring 242 does not overlap with and is exposed from at least all of the shield electrodes 240 other than the shied electrode 240 connected thereto similar to the sensor wirings 224. Alternatively, each shield wiring 242 does not overlap with and is exposed from all of the shield electrodes 240.

Similar to the sensor electrodes 206, auxiliary wirings (auxiliary shield wirings) 244 may be connected to the shield electrodes 240. That is, the auxiliary shield wirings 244 respectively corresponding to the plurality of shield electrodes 240 may be disposed outside the sensor region 208. An edge of each auxiliary shield wiring 244 is electrically connected to the corresponding shield electrode 240, and the other terminal portion is not connected to any other conductive component.

As described above, the shield electrodes 238 and/or the shield electrodes 240 are disposed outside the sensor region 208 in the sensor module 200. Hence, even if the input means approaches the edge portion of the sensor region 208, detection without any variation is feasible because a uniform electric field is generated between the input means and the sensor region 208 and because a part of the electric filed overlapping the sensor electrodes 206 is detected as a capacitance variation. In addition, the detection accuracy does not decrease because it is possible to suppress the capacitance formation between the outside of the sensor region 208 and the input means.

Moreover, the plurality of shield electrodes 238 and/or the plurality of shield electrodes 240 are disposed. In a case where a single number of shield electrodes is disposed outside the sensor region 208, the approach of the input means to the edge portion of the sensor region 208 influences the whole of the periphery of the sensor region 208. However, the detection accuracy can be maintained even at the edge portion of the sensor region 208, and the coordinates of the input means can be more accurately identified because the decrease in amount of potential variation of the sensor electrodes 206 caused when the input means approaches the edge portion of the sensor region 208 can be limited to a local region by providing the plurality of shield electrodes 238 and/or the plurality of shield electrodes 240.

Furthermore, the formation of the shield electrodes 238 and/or the shield electrodes 240 allows the formation of a structure the same as that of the sensor region 208 outside the display region 120, by which not only can the detection sensitivity at the edge portion of the display region 120 be maintained, but also the influence of the display module 110 can be effectively blocked.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process is included in the scope of the present invention as long as they possess the concept of the present invention.

It is understood that another effect different from that provided by each of the aforementioned embodiments is achieved by the present invention if the effect is obvious from the description in the specification or readily conceived by persons ordinarily skilled in the art.

What is claimed is:

1. A sensor module comprising:
   a plurality of sensor electrodes arranged in a plurality of rows and a plurality of columns;
   a plurality of terminals respectively corresponding to the plurality of sensor electrodes;
   a plurality of sensor wirings respectively corresponding to the plurality of sensor electrodes;
   a plurality of auxiliary wirings respectively corresponding to the plurality of sensor electrodes; and
   a plurality of shield electrodes arranged so that, in each column, the plurality of sensor electrodes is sandwiched by the shield electrode and the terminals in the column direction,
   wherein each of the plurality of sensor wirings electrically connects the respective sensor electrode to the respective terminal without passing through any other sensor electrode,
   each of the plurality of sensor electrodes does not overlap at least the plurality of sensor wirings other than the corresponding sensor wiring,
   each of the plurality of auxiliary wirings is electrically connected to the corresponding sensor electrode and extends in a direction opposite to the terminal,
   the plurality of shield electrodes is arranged so that, in each column, edge portions of the plurality of auxiliary wirings overlap the shield electrode in the column direction and a row direction, and
   each of the plurality of auxiliary wirings does not overlap the plurality of sensor electrodes in a column direction.

2. The sensor module according to claim 1,
   wherein each of the plurality of sensor electrodes does not overlap the plurality of sensor wirings including the corresponding sensor wiring.

3. The sensor module according to claim 1,
   wherein, in each of the plurality of columns, the plurality of sensor electrodes increases in area with increasing distance from the terminals.

4. The sensor module according to claim 1, further comprising a plurality of shield wirings passing through the plurality of rows,
   wherein the plurality of shield wirings each spaced away from the plurality of sensor electrodes, and
   the plurality of shield wirings and the plurality of sensor electrodes alternate with each other in each of the plurality of rows.

5. The sensor module according to claim 4,
   wherein, in each of the plurality of shield wirings, an edge portion opposite to the terminal is located outside a sensor region including the plurality of sensor electrodes, and
   the sensor region is a minimum region surrounding the plurality of sensor electrodes.

6. The sensor module according to claim 4,
   wherein a length of each of the plurality of shield wirings in a row direction increases with increasing distance from the terminal.

7. The sensor module according to claim 1,
   wherein, in each of the plurality of auxiliary wirings, an edge portion on a side opposite to the terminal is located outside a sensor region including the plurality of sensor electrodes, and
   the sensor region is a minimum region surrounding the plurality of sensor electrodes.

8. A display device comprising:
   a display module comprising an array substrate having a display region including a plurality of pixels; and
   a sensor module over the display module, the sensor module comprising:
      a plurality of sensor electrodes arranged in a plurality of rows and a plurality of columns;
      a plurality of terminals respectively corresponding to the plurality of sensor electrodes;
      a plurality of sensor wirings respectively corresponding to the plurality of sensor electrodes; and
      a plurality of auxiliary wirings respectively corresponding to the plurality of sensor electrodes; and
      a plurality of shield electrodes arranged so that, in each column, the plurality of sensor electrodes is sandwiched by the shield electrode and the terminals in the column direction,
   wherein each of the plurality of sensor wirings electrically connects the respective sensor electrode to the respective terminal without passing through any other sensor electrode,
   each of the plurality of sensor electrodes does not overlap at least the plurality of sensor wirings other than the corresponding sensor wiring,
   each of the plurality of auxiliary wirings is electrically connected to the corresponding sensor electrode and extends in a direction opposite to the terminal,
   the plurality of shield electrodes is arranged so that, in each column, edge portions of the plurality of auxiliary wirings overlap the shield electrode in the column direction and a row direction, and
   each of the plurality of auxiliary wirings does not overlap the plurality of sensor electrodes in a column direction.

9. The sensor module according to claim 1, further comprising a plurality of shield wirings passing through the plurality of rows and respectively connected to the plurality of shield electrodes, wherein
   the plurality of shield wirings are each spaced away from the plurality of sensor electrodes, and
   the plurality of shield wirings and the plurality of sensor electrodes alternate with each other in each of the plurality of rows.

10. The display device according to claim 8,
    wherein the plurality of shield electrodes do not overlap the display region.

11. The display device according to claim 8, further comprising a plurality of shield wirings passing through the plurality of rows and respectively connected to the plurality of shield electrodes, wherein
    the plurality of shield wirings are each spaced away from the plurality of sensor electrodes, and
    the plurality of shield wirings and the plurality of sensor electrodes alternate with each other in each of the plurality of rows.

* * * * *